Sept. 1, 1953 C. W. CHENEY 2,650,405
BAND CLIP HAVING CLOSING WORM GEAR
Filed March 23, 1951
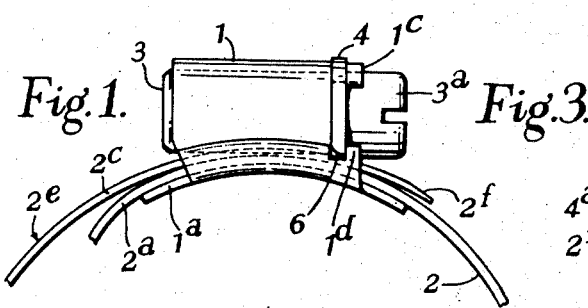
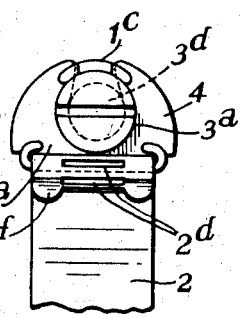
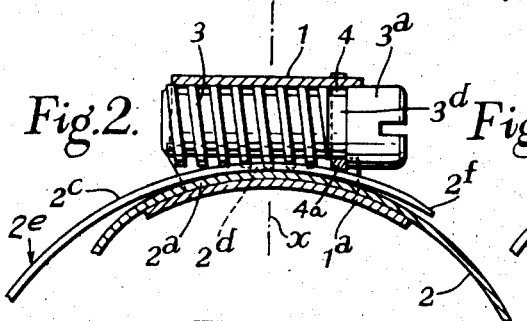
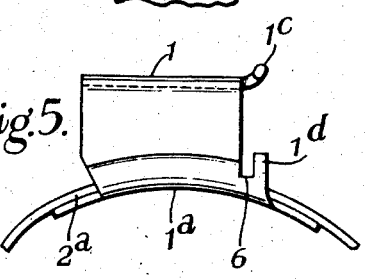
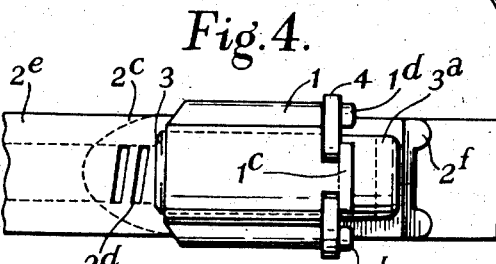
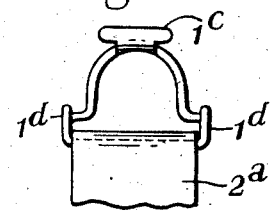
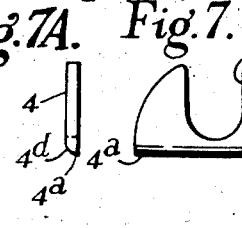
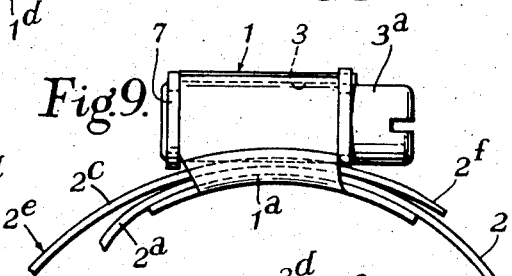
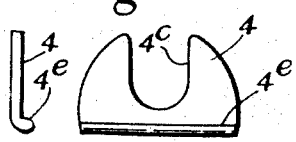
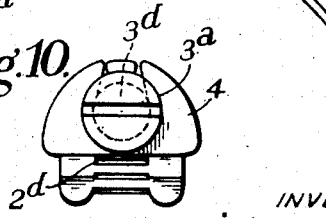
INVENTOR
Charles William Cheney
BY
Richardson, Davis and Norton
his ATTORNEYS Patented Sept. 1, 1953

2,650,405

UNITED STATES PATENT OFFICE 2,650,405

BAND CLIP HAVING CLOSING WORM GEAR

Charles William Cheney, Hockley, Birmingham, England

Application March 23, 1951, Serial No. 217,215
In Great Britain March 28, 1950

2 Claims. (Cl. 24—274)

A worm-geared band clip of the kind to which the invention refers comprises a tubular housing to which the one end portion of a circular band is fixed and through which a toothed end of the band is drawn while bearing against the upper surface of the housing end of the band, a worm being supported revolubly and longitudinally tiltably within the housing tangentially of the circle of the band whereby a few worm threads only will engage teeth of the band, and a radially movable abutment washer applied to a circular neck at the head end of the worm to transmit the band closing stresses form the neck of the worm to the housing and transmit the tilting stresses through the washer to the toothed end portion of the band.

In a worm-geared band clip of this kind, the head end of the worm is either of the same diameter as the worm threads or of a smaller diameter than the worm threads, the neck constituting an effective shoulder to transmit through the washer the band closing tension to the housing, such a band clip being described and illustrated in the U. S. Patent No. 2,477,045, dated July 26, 1949.

In all band clips of the circular band kind to which the invention solely relates the closing stresses cause the worm to tilt or rock in the housing from the thread and teeth engagement to thereby cause "dip" of the head end of the worm, and an insufficient thread and tooth engagement resulting in fracture of either, or slip of band closing grip on the articles. Clips of this kind are used extensively in various sizes from one inch in diameter to six inches in diameter, those mostly in use being from two to four inches in diameter.

It is now found by tests and experience in the use of such clips that due to working tolerances between the worm threads and the teeth and between the worm itself and the housing, and, more particularly, due to vibration and changes of temperature, to which such clips are subjected while in use, particularly upon aircraft, looseness in the grip develops after final tightening, with very serious and sometimes fatal consequences. With all diameters of clips, if there is an appreciable radius of curvature in the band there will always be dip of the head end of the worm.

The object of the invention is to provide a clip of the kind described but which will grip articles securely under conditions of general use, backlash or reaction after final tensioning, and looseness due to vibrations and other factors, being prevented or minimised.

A worm-geared band clip according to the invention is characterised by a construction in which "dip" of the head end of the worm automatically forces a flat and solid base of a head end tensioning washer downwardly or radially inwardly against the supported toothed end of the band with frictional pressure equal, substantially, to the band closing stresses in operation for grip.

The invention also includes certain other features of construction which will be hereinafter specifically described with reference to the accompanying drawing showing a clip of the kind using a worm having a head of the same diameter as the worm threads, one form of the invention relying upon a head end washer for applying and releasing the tension and for preventing removal of the worm from the housing and another modified form using what is well known as "a riveted up tail washer" in addition to the head washer, said tail washer to bear releasing stresses and prevent the worm leaving the housing.

Fig. 1 is a side elevation.

Fig. 2 is a side elevation of the clip of Fig. 1, partly in section.

Fig. 3 is an end elevation of the clip shown in Figs. 1 and 2.

Fig. 4 is a plan view of the clip shown in Figs. 1 and 2.

Fig. 5 is a side elevation of the housing with the worm and washer removed, prior to assembly.

Fig. 6 is an end view of the housing shown in Fig. 5.

Figure 7 is a front elevation of the washer employed at the head end of the worm, and shown before it has been secured to the band clip and partially closed about the neck of the worm.

Figure 7A is a side elevation of the washer of Figure 7.

Figure 8 is a front elevation of the washer indicated in Figures 7 and 7A.

Figure 8A is a side elevation of the washer of Figure 8.

Fig. 9 is a side elevation of a modified form of the invention having a tail washer, and Fig. 10 is an end elevation of Fig. 9.

With reference to Figs. 1 to 7, 1 is a tubular rigid housing open at both ends, 2a is the plain end of the band 2 fixed within the base 1a of the housing and 2c is the toothed end of the band 2 adapted to be drawn through the housing 1 by the worm 3 while lying over the housing end of the band being guided by the enlarged side portions of the housing.

The teeth 2d are formed intermediate uniformly spaced depressions in the surface of the band and are flush with its face 2e.

The leading tip 2f of the toothed end of the band is of wedge-like shape.

The worm 3 has a head portion 3a external to the housing 1 and of the same diameter as the external diameter of the worm threads. Between the head portion 3a and the threaded portion of the worm threads a circular neck 3d of reduced diameter is provided upon which a transverse tensioning washer 4 is closed to move radially inwardly or outwardly with the head portion 3a and while permitting the neck to revolve freely in the washer 4. The lower side of the neck portion 3d of worm 3 engages the inner edge portion of washer 4 laterally, whereby washer 4 may be moved radially inwardly.

The washer 44 operates between the neck 3d and the housing 1 to transmit the band closing stresses longitudinally from the head portion 3a to said housing, and also by its solid and flat base 4a to press forcibly against the toothed end of the band to create frictional resistance between the washer and the toothed end accompanying "dip" or radial inward movement of the head portion 3a of the worm when the clip is tensioned around a hose tube or the like.

The washer 4 has a gap 4c in it closed partly on around the neck 3d and is held against the end of the housing 1 by the T-shaped extension 1c of the crown of said housing and by the inner base projections 1d so that no tail washer is needed. Said washer has a rounded leading edge 4d.

It will be appreciated that the worm engages the housing a rotatable working fit and the worm threads engage the teeth a workable fit, and that a few only of the threads and teeth engage dependent upon the size of the clip, hence "dip" of the head end 3a of the worm takes place when the clip is being tightened onto a pipe or tube, the worm rocking on the teeth about a position represented by the dotted line X in Fig. 2, it being appreciated that such band clips are mass produced.

It has been demonstrated that such "dip" takes place and the invention utilises this "dip" to exert pressure of the solid base washer 4 against the toothed end of the band to lock or secure the closing tension against vibrations, backlash and reaction tending to loosen the grip, said securing being relative to the band closing tension.

In operation, the worm 3 is turned in a clockwise direction as viewed in Fig. 3 to effect tightening of the clip. The helical thread of worm 3 engages a few of the teeth formed in the outer surface of the toothed end portion of the circular band 2. As viewed in Fig. 2, during tightening of the clip, the free end 2f of the circular band member 2 is drawn toward the right, producing a force of reaction toward the left acting along the lower edge of the helical threads of the worm 3. This force of reaction causes a turning moment tending to rotate or tilt the longitudinal axis of the worm 3 in a clockwise direction as viewed in Fig. 2. Since the left end of a worm 3 cannot move upwardly, being restrained by the crown of the housing 1, the right end with its head portion 3a tends to move downwardly, or radially inwardly, causing a corresponding movement of washer 4 whose base 4a is thereby forced into frictional engagement with the outer surface of the toothed end portion of band 2, interfering engagement with the teeth 2d being prevented by the fact that they are flush with the outer surface of the band 2.

As clearly shown at 6 in Fig. 1, the washer 4 is not at any time vertically supported at its solid base on the housing, but only makes powerful frictional contact vertically with the face of the toothed end 2e of the band without engaging any teeth. The washer 4 in Fig. 8 is flanged or ribbed at its base 4e for strength.

Figures 5 and 6 show the housing 1 prior to assembly of the worm 3 and washer 4 therein. The T-shaped extension 1c of the crown of housing 1 is shown turned upwardly to facilitate assembly. After assembly, the T-shaped crown extension 1c is bent into the shape shown in Figs. 1 to 3 so that the worm 3 and washer 4 are permanently, yet freely movably assembled within the housing 1.

In Figs. 9 and 10 the worm 3 has applied to it a riveted up tail washer 7 to bear any band releasing stresses in substitution for the extension 1c and the side projections 1d of the housing 1, otherwise, the housing, worm, band ends and washer are the same as in Figs. 1 to 7 and similar references are used to indicate the respective parts.

The invention is applicable to a worm-geared band clip of the kind and in which the worm has a head larger in diameter than the worm threads, the washer 4 being mounted upon a circular collar immediately under the head to operate on the toothed end of the band as and for the purpose described, the band closing tension being applied through the washer from the large diameter head.

What I claim is:

1. A band clip of the class described, comprising: a circular band member having uniformly spaced depressions formed therein to provide teeth on an external surface, adjacent to one end portion thereof; an open ended tubular housing mounted on the other end portion of said band member and spaced therefrom to permit passage of said toothed end portion therebetween; a worm member rotatably and tiltably mounted in said housing for engagement with said teeth, said worm member having a head portion external to said housing; and a radially movable abutment washer laterally engageable by said worm and interposed between said housing and said head portion, said washer being engageable with said toothed end portion while providing clearance for said teeth, whereby tightening of said clip by turning of said worm forces said abutment washer into frictional engagement with said toothed end portion, said radial movement being caused, at least in part, by tilting of said worm.

2. A band clip according to claim 1, wherein said worm member is provided with a neck portion of reduced diameter intermediate said head portion and said housing, said abutment washer being laterally engageable by said neck portion for causing said radial movement of said washer.

CHARLES WILLIAM CHENEY.

References Cited in the file of this patent

UNITED STATES PATENTS

| Number | Name | Date |
|---|---|---|
| 2,384,094 | Jamie | Sept. 4, 1945 |
| 2,487,296 | Bergström | Nov. 8, 1949 |

FOREIGN PATENTS

| Number | Country | Date |
|---|---|---|
| 914,467 | France | June 17, 1946 |
| | (Corresponding Great Britain 660,981, Nov. 14, 1951) | |